United States Patent [19]
Aihara et al.

[11] Patent Number: 5,535,196
[45] Date of Patent: Jul. 9, 1996

[54] POLICE SYSTEM OF ATM EXCHANGE

[75] Inventors: Naoki Aihara; Tadashi Hoshino, both of Kawasaki, Japan

[73] Assignee: Fujitsu Limited, Kanagawa, Japan

[21] Appl. No.: 968,042

[22] Filed: Oct. 28, 1992

[30] Foreign Application Priority Data

Oct. 28, 1991 [JP] Japan .................. 3-280236

[51] Int. Cl.$^6$ .................................................. H04J 3/22
[52] U.S. Cl. .................. 370/60; 370/61; 370/79
[58] Field of Search ............... 370/60, 60.1, 61, 370/79, 84, 94.1, 94.2

[56] References Cited

U.S. PATENT DOCUMENTS

| | | | |
|---|---|---|---|
| 5,132,966 | 7/1992 | Hayano et al. | 370/79 |
| 5,253,247 | 10/1993 | Hirose et al. | 370/14 |
| 5,394,396 | 2/1995 | Yoshimura et al. | 370/79 X |

*Primary Examiner*—Melvin Marcelo

[57] ABSTRACT

A police system of ATM exchange comprises an ATM exchange for exchanging the ATM cells, and an input cell speed limiting unit disposed in an input side of the ATM exchange and having a plurality of elastic buffers with a read speed equivalent to a band designated to each of a plurality of subscribers accommodated in the exchange, the elastic buffers being in accordance with the subscribers, the input cell speed limiting unit being arranged to limit the speeds of cells which are transmitted from each of the subscribers to the exchange to the band designated to each of the subscriber. The ATM exchange can completely manage and restrict the band of a line. Even if a congestion state takes place instantaneously due to an excessive cell flow, it does not affect calls which are in compliance with a predetermined band.

12 Claims, 17 Drawing Sheets

GFC : GENERIC FLOW CONTROL (FOR CONTROLLING INTERFACE APPLICABLE ONLY FOR UNI)
PTI : PAYLOAD TYPE INDICATOR (REPRESENTING COMMUNICATION TYPE)
CLP : CELL LOSS PRIORITY (UNUSED AREA)

$\overline{WE}$ : WRITE ENABLE

POLICE SYSTEM OF ATM EXCHANGE

BACKGROUND OF THE INVENTION

1. Field of the Invention

The present invention relates to a communication system using asynchronous transmission mode (ATM) cells for use in a broadband ISDN or the like, and in particular, to a police system of ATM exchange for preventing speeds of ATM cells which are received from subscribers from exceeding a predetermined band.

2. Description of the Related Art

FIG. 1 shows an example of the construction of a broadband ISDN system. In the figure, a user terminal 1 of a transmission side of a broadband ISDN system divides digitized information such as sound, data, image, and so forth into ATM cells of fixed length. At the beginning of each ATM cell, a header which represents the address of the cell is added. The resultant ATM cell is sent over a transmission line 3 through an ATM exchange 2. On a receive side of the system, an ATM exchange 4 exchanges the ATM cell and sends it to a user terminal 5 of the address.

In an asynchronous transmission mode (ATM) system which is a broadband ISDN transmission system, the transmission speed of subscriber lines is designated as 155.52 Mbit/S or the quadruple value thereof. Data to be transmitted is divided into blocks of fixed length. These blocks are referred to as ATM cells.

FIG. 2 shows an example of the format of an ATM cell. In the figure, the total length of each ATM cell 6 is 53 bytes. The ATM cell 6 is composed of a header field 7 of five bytes and an information field 8 of 48 bytes. The header field 7 stores a virtual path identifier (VPI), a virtual channel identifier (VCI), and so forth. The VPI and the VCI are used to identify each subscriber. The information field 8 stores transmission data. The last one byte of the header field 7 is a header error control (HEC) in which header correction control data is stored.

FIG. 3 shows the construction of the header portion of the ATM cell of FIG. 2 in detail. In the figure, the virtual path identifier (VPI) is stored in the first and second bytes of the header portion of five bytes and the virtual channel identifier (VCI) in the second to fourth bytes thereof. The designating method of the VPI and VCI for each subscriber (terminal) has been set forth in CCITT Recommendation. However, actually, any values can be designated to the VPI and VCI.

As described above, the present invention relates to a police system of ATM exchange. The police system serves to manage the band of cells which are transmitted from the user terminal 1 to the ATM exchange 2 shown in FIG. 1. The police system verifies whether or not the band of cells received from each subscriber deviates from a band which has been arranged between the exchange side and the subscriber side and if necessary to stop receiving cells from the subscriber so as to effectively use the band resources of the exchange and network and prevent the network from becoming congested.

Since the ATM exchanging technology is a new art, there are not so many police systems which have been disclosed. As an example of this art, a technique for counting the number of cells which are transmitted in a particular unit time is known. However, in this technique, since band congestion could not be detected, it was impossible to prevent excessive cells from entering a network. Thus, the network could not be protected from band congestion which took place instantaneously.

SUMMARY OF THE INVENTION

An object of the present invention is to provide a policing system of ATM exchange for preventing speeds of ATM cells which are received from each subscriber from exceeding a predetermined band.

A feature of the present invention resides in a police system of ATM exchange for use in an ATM communication system with asynchronous transmission mode (ATM) cells, comprising an ATM exchange for exchanging said ATM cells and input cell speed limiting means disposed in an input side of said ATM exchange and having a plurality of elastic buffers with a read speed equivalent to a band designated to each of a plurality of subscribers accommodated in said exchange, said elastic buffers being in accordance with said subscribers, said input cell speed limiting means being arranged to limit the speeds of cells which are transmitted from each of said subscribers to said exchange to the band designated to each of said subscriber.

BRIEF DESCRIPTION OF DRAWINGS

One skilled in the art can easily understand additional feature and objects of this invention from the description of the preferred embodiments and some of attached drawings. In the drawings;

FIG. 13A to 13C provide a schematic diagram describing limitation of an input band of an ATM exchange;

DESCRIPTION OF PREFERRED EMBODIMENTS

Figure 4:
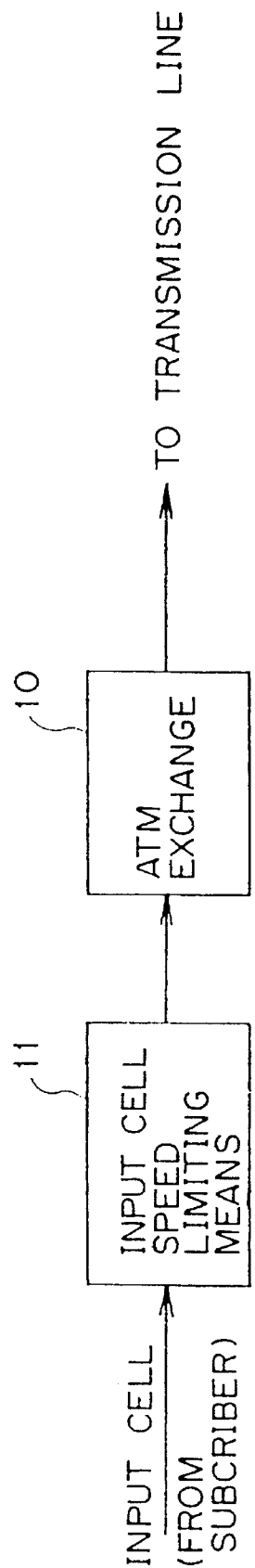
FIG. 4 is a block diagram showing the theory of the present invention.

FIG. 4 is a block diagram for explaining the principle of the present invention. It shows the principle of a police system using an asynchronous transmission mode (ATM) exchange designed to prevent the congestion caused by cells inputted in excess beyond the band assigned to subscribers in an ATM communication system using an ATM cells.

In FIG. 4, the input cell speed limiting means 11 is provided on the input side of the ATM exchange 10 in the ATM communication system, changes the input speed at writing and reading units, comprises an elastic buffer having a read speed pertaining to the band assigned to subscribers accommodated in the exchange 10, and limits the speed of cells inputted by the subscribers accommodated in the exchange.

In the present invention, the elastic buffer constructing the input cell speed limiting means 11 is disposed in accordance with the set of the virtual path identifier (VPI) and the virtual channel identifier (VCI) designated to each subscriber accommodated in the ATM exchange 10. In addition, the read speed of the elastic buffer is set to a value equivalent to a band designated to each subscriber. Thus, the speeds of cells received by the ATM exchange do not exceed the value equivalent to the band which has been designated to each subscriber, thereby preventing the network from becoming congested due to excessive cells which pass through the band.

On the input side of each elastic buffer, a matcher for identifying the set of the virtual path identifier (VPI) and virtual channel identifier (VCI) added to each ATM cell which is transmitted by each subscriber is disposed. Due to the marcher, only ATM cells with the VPI and VCI according to a particular subscriber are input to the elastic buffer provided for this subscriber. By sending the output of each elastic buffer to the ATM exchange through a multiplexer or the like, ATM cells are exchanged so that they do not exceed the band designated to each subscriber.

According to the present invention, the ATM exchange can completely manage and restrict the band of a line. Even if a congestion state takes place instantaneously due to an excessive cell flow, it does not affect calls which are compliance with a predetermined band. As a result, the communication reliability can be remarkably improved.

The features and advantages of the present invention will become more apparent in light of the following detailed description of a best mode embodiment thereof, as illustrated in the accompanying drawings.

Figure 1:
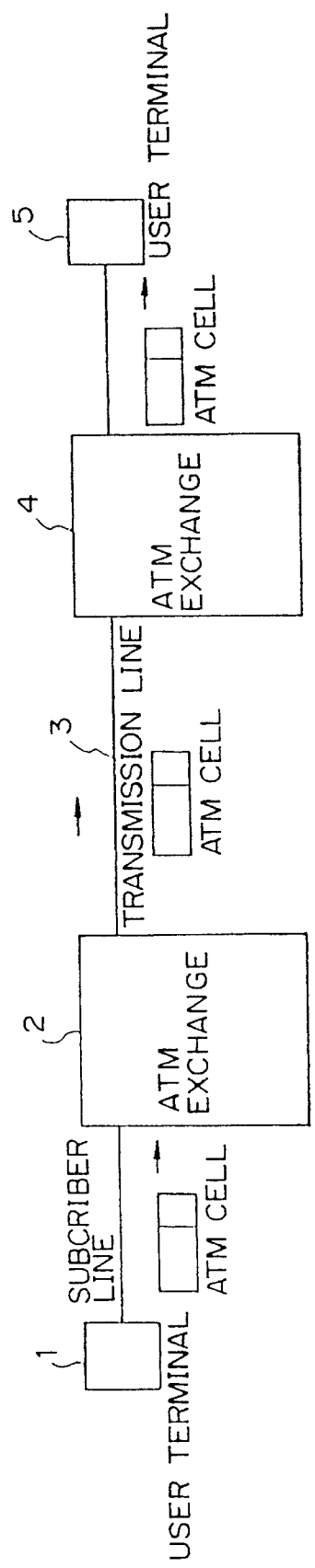
FIG. 1 is a schematic diagram showing an example of the construction of a broadband ISDN system.
Figure 2:
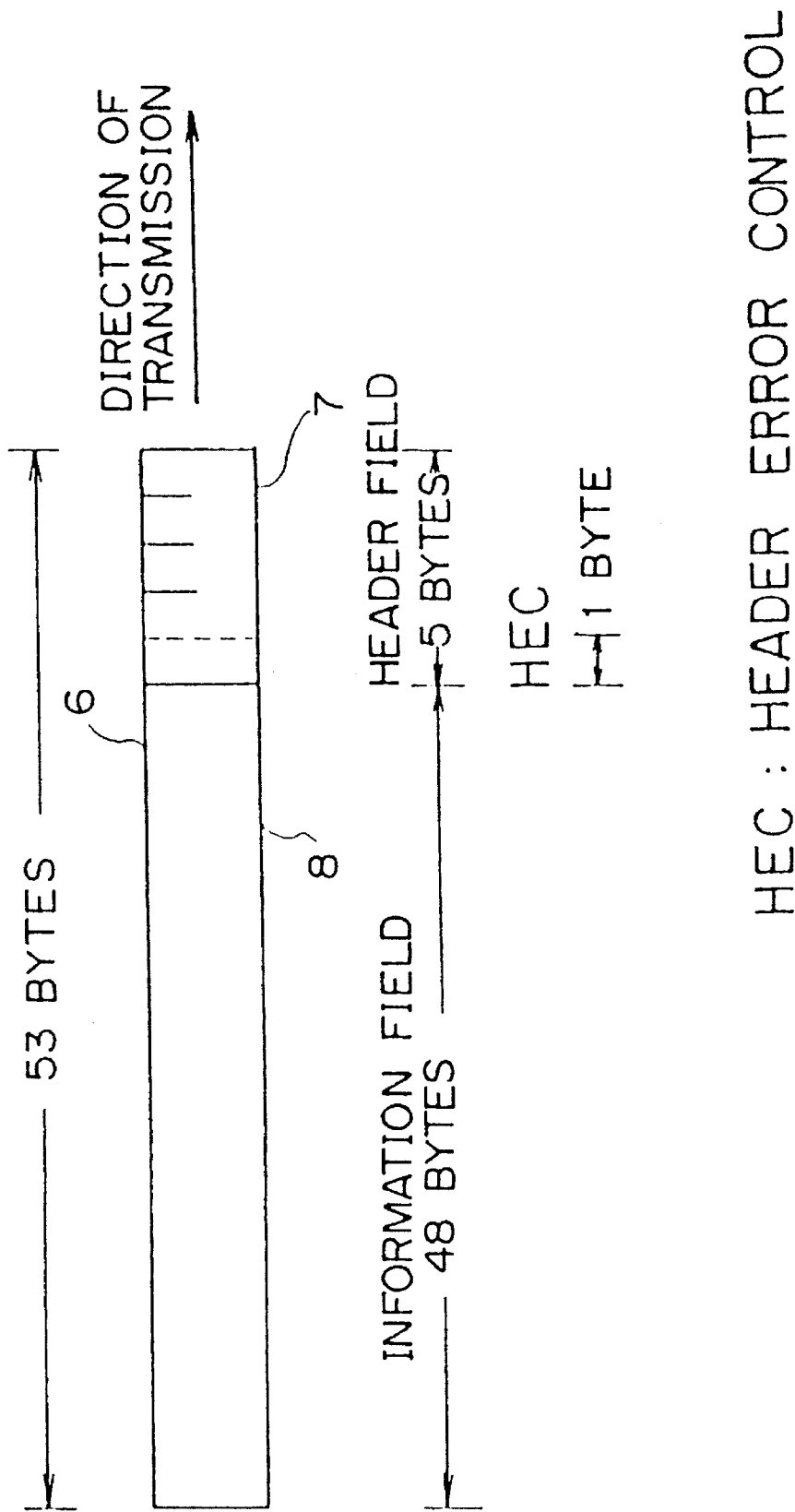
FIG. 2 is a schematic diagram showing the format of an ATM cell.
Figure 3:
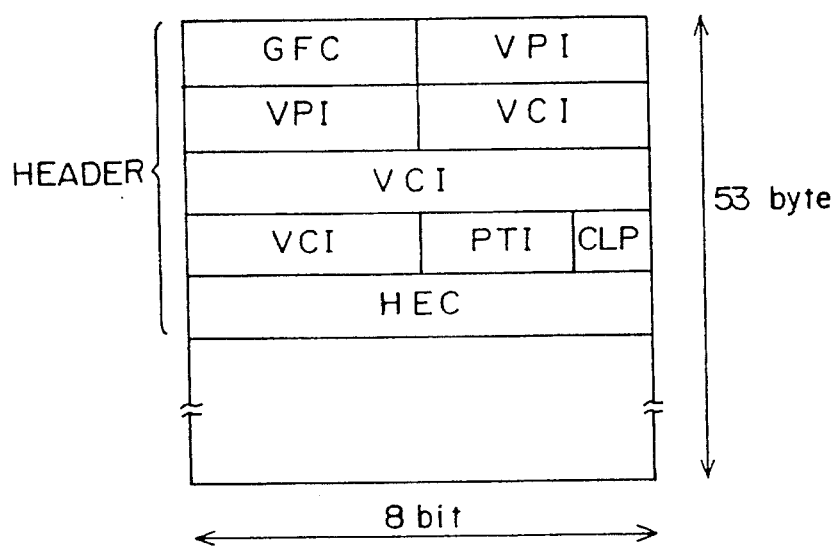
FIG. 3 is a schematic diagram showing the construction of the header portion of an ATM cell in detail.
Figure 5:
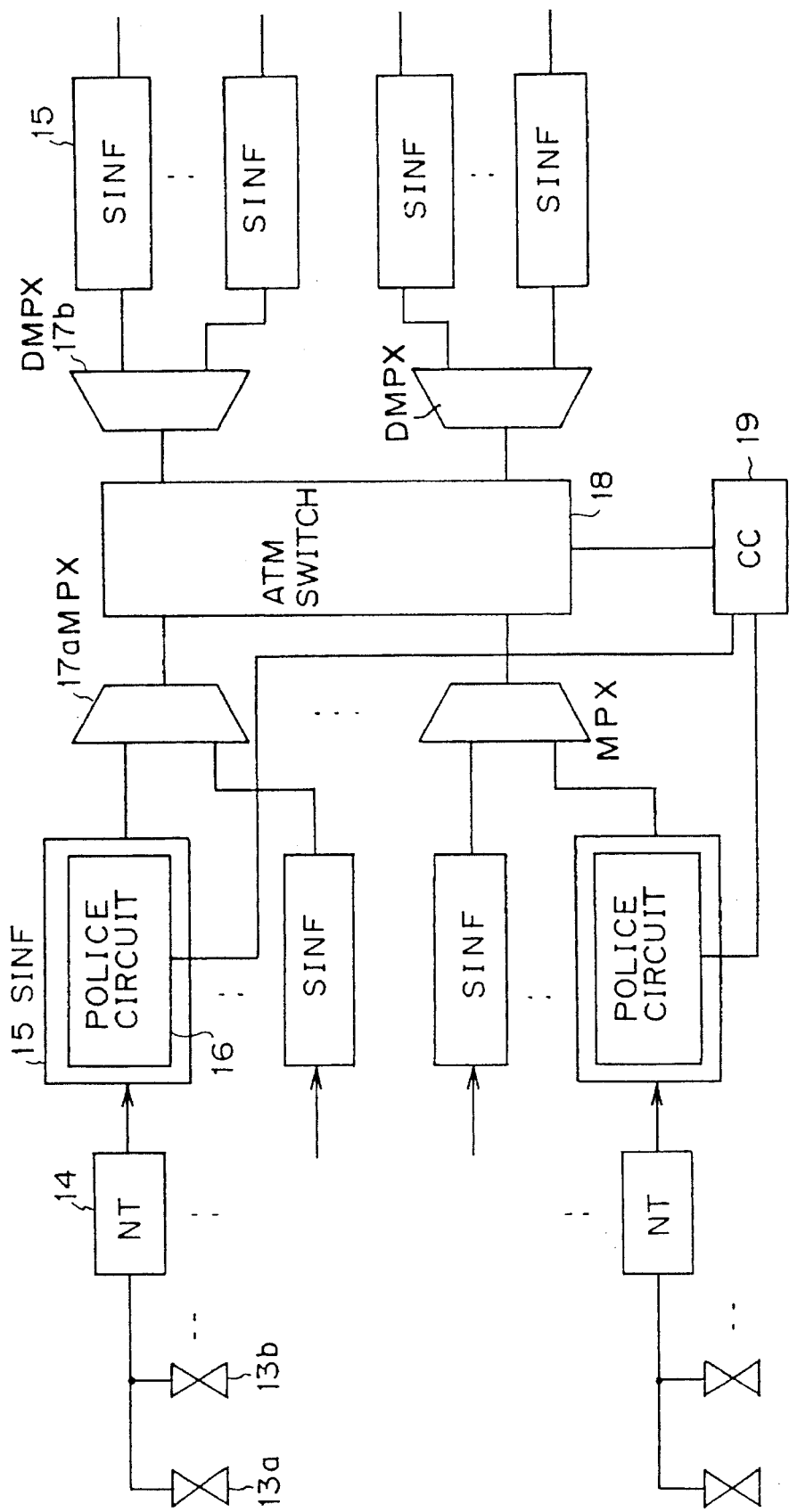
FIG. 5 is a block diagram showing the construction of an ATM communication system using a police system of the present invention.

FIG. 5 is a block diagram showing the construction of an ATM communication system using a police system in accordance with the present invention. FIG. 5 shows the input side of the ATM exchange 2 of FIG. 1. In FIG. 5, a plurality of subscriber terminals 13a, 13b, . . . , and so forth are connected through respective network terminator (NT) 14 such as line concentrators to respective line interfaces 15 (SINF) which are part of the ATM exchange system. A police circuit 16 of the present invention is disposed in the line interface 15. A central control unit (CC) 19 of the exchange system sends values of a virtual path identifier (VPI) and a virtual channel identifier (VCI) to the police circuit 16. The construction of other portions (namely, a multiplexer 17a, a demultiplexer 17b, and an ATM switch 18 of the exchange system is similar to that of a conventional system.

Figure 6:
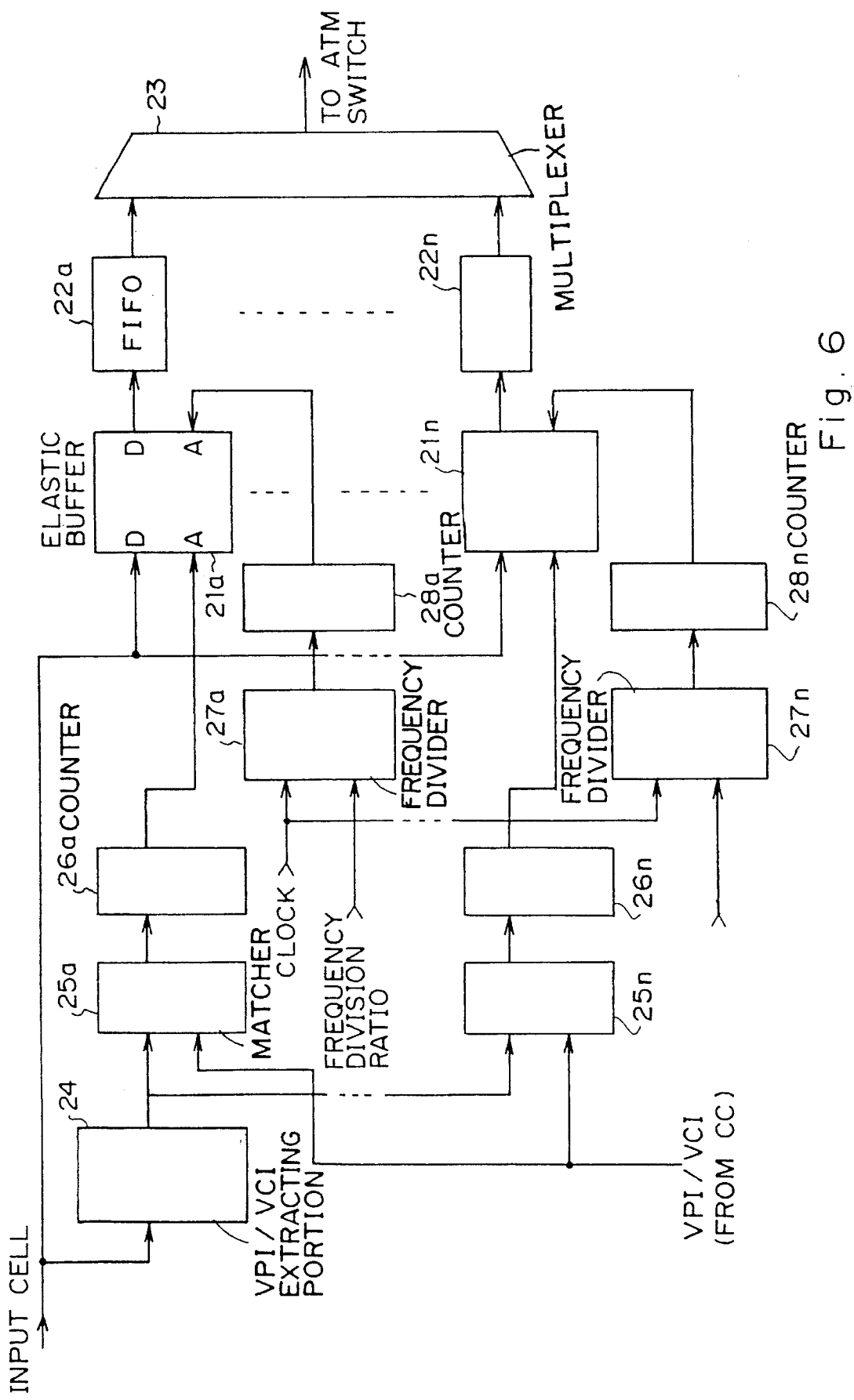
FIG. 6 is a block diagram showing the construction of a police circuit of an embodiment of the present invention.

FIG. 6 shows a block diagram of the construction of a police circuit of an embodiment of the present invention. In the figure, the police circuit comprises elastic buffers 21a to 21n, first-in first-out (FIFO) memories 22a to 22n, a multiplexer 23, a VPI/VCI extracting portion 24, matchers 25a to 25n, counters 26a to 26n, frequency dividers 27a to 27n, and counters 28a to 28n. The elastic buffers 21a to 21n are disposed in correspondence with respective subscribers accommodated in the ATM exchange. The first-in first-out (FIFO) memories 22a to 22n are disposed on the output side of the respective elastic buffers 21a to 21n. The multiplexer 23 multiplexes the output of each FIFO memory and sends the resultant data to the ATM switch. The VPI/VCI extracting portion 24 extracts the VPI and VCI from each input ATM cell. Each of the marchers 25a to 25n compares the extracted result from the VPI/VCI extracting portion 24 with the values of the VPI and the VCI designated by the central control unit (CC) 19 of the exchange system of FIG. 5 and is disposed in accordance with each elastic buffer. The counters 26a to 26n count the outputs of the matching results of the matchers 25a to 25n and send the resultant values to the elastic buffers 21a to 21n as their write addresses, respectively. The frequency dividers 27a to 27b divide the frequency of the clock. The counters 28a to 28n count the outputs of the frequency dividers and send the resultant values to the elastic buffers as their read addresses, respectively.

Figure 7:
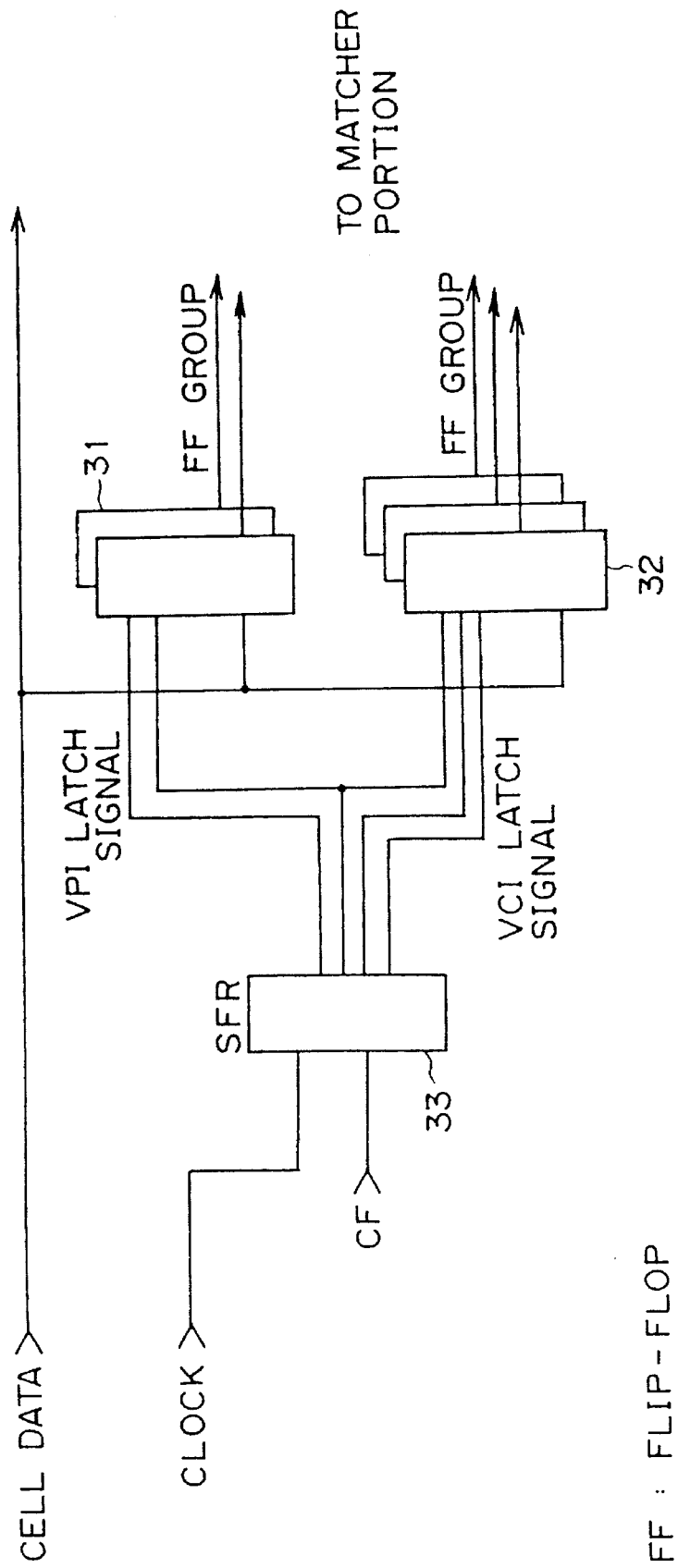
FIG. 7 is a circuit diagram showing the construction of a VPI/VCI extracting portion in detail.

FIG. 7 is a block diagram showing the construction of the VPI/VCI extracting portion 24 of FIG. 6 in detail. In the figure, data of an input ATM cell is supplied to two flip-flop (FF) groups 31 and 32. The FF group 31 latches the bits of the VPI at the first and second bytes of the ATM cell. On the other hand, the FF group 32 latches the bits of the VCI at the second, third, and fourth bytes of the ATM cell. A data latch command signal is supplied to the FF groups 31 and 32 by a shift register 33. The shift register 33 receives a frame pulse CF and a clock signal. The frame pulse CF represents the start position of each ATM cell. The shift register 33 generates the latch command signal for latching each byte of the VPI/VCI at the first to fourth bytes of the ATM cell and supplies this signal to the FF groups 31 and 32.

Figure 8:
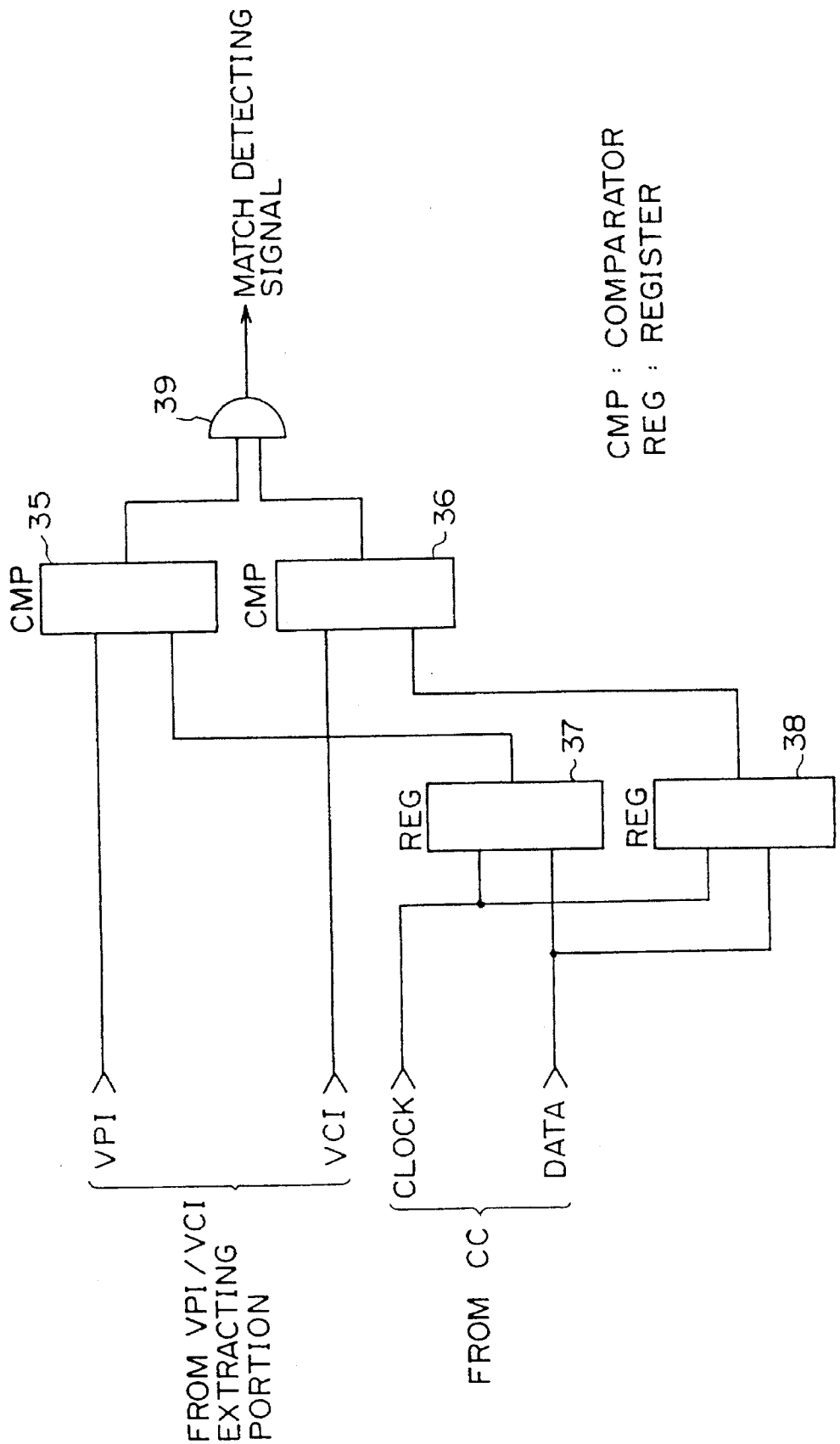
FIG. 8 is a block diagram showing the construction of a marcher in detail.

FIG. 8 is a block diagram showing the construction of each of the marchers 25a, . . . , 25n of FIG. 6 in detail. In the figure, the values of the VPI and VCI extracted by the VPI/VCI extracting portion 24 are supplied to two comparators 35 and 36, respectively. In addition, the values of the VPI and VCI supplied by the central control unit (CC) 19 of the ATM exchange shown in FIG. 5 are supplied to two registers 37 and 38, respectively. The comparators 35 and 36 compare the contents of the registers 37 and 38 with the contents extracted by the VPI/VCI extracting portion 24, respectively. When both the comparators 35 and 36 determine that the respective values match, an AND circuit 39 outputs a match detection signal.

Figure 9:
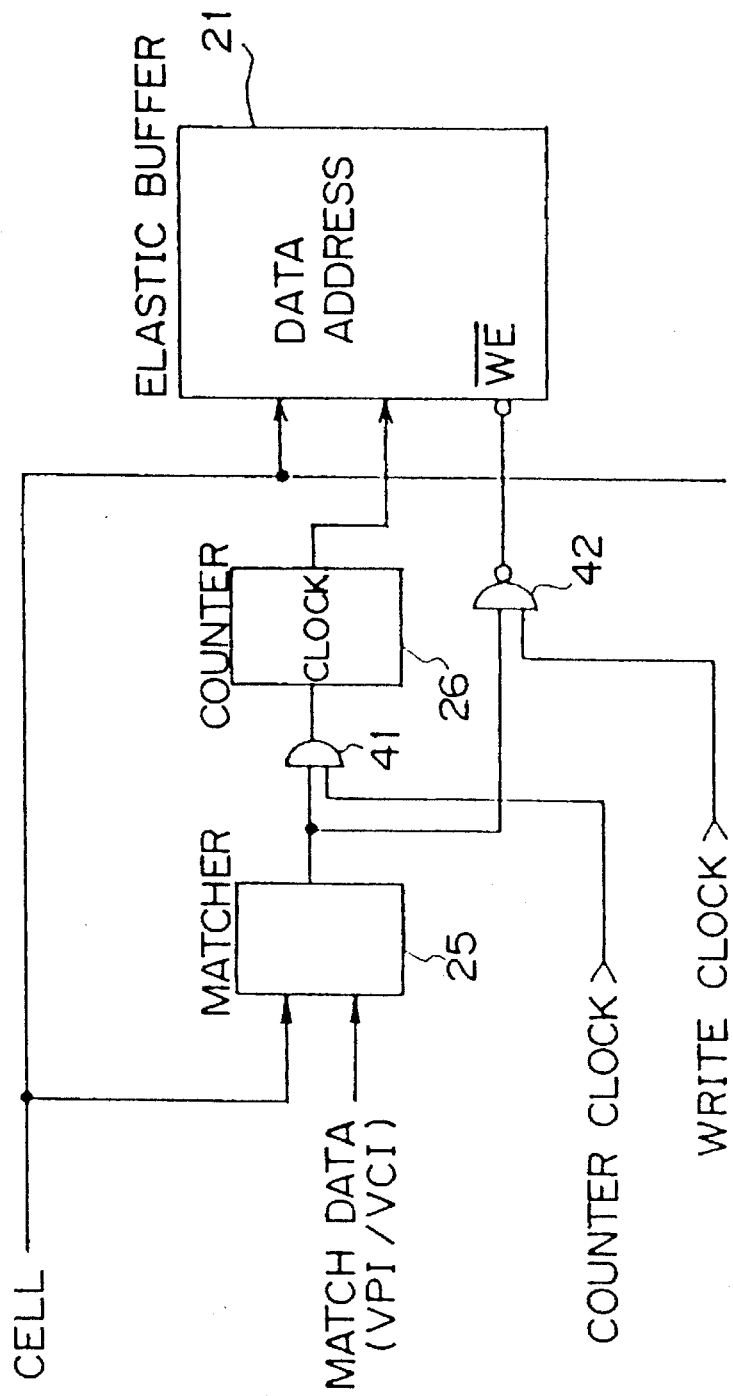
FIG. 9 is a block diagram showing the construction of adjacent portions of an elastic buffer and describing a data write operation.

FIG. 9 is a block diagram showing the construction of the write side of each of the elastic buffers of the embodiment of FIG. 6. In FIG. 9, the write operation of one of the elastic buffers of FIG. 6 is described.

Figure 10:
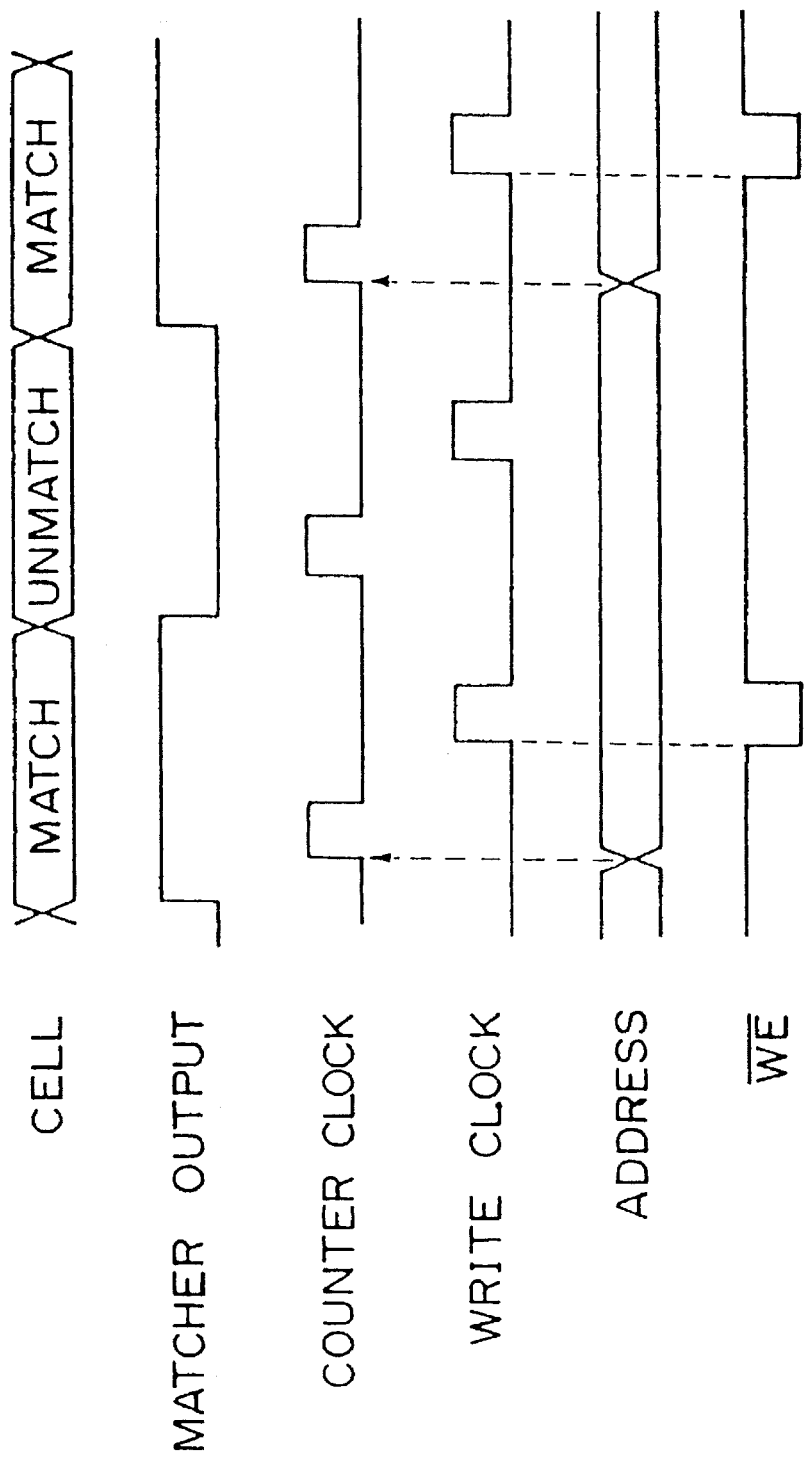
FIG. 10 is a schematic diagram showing a timing diagram of a data write operation of the circuit of FIG. 9.

In FIG. 9, as described above, a marcher 25 compares values of the VPI and VCI of an input cell with match data which is values of the VPI and VCI supplied by the central control unit of the exchange system. When the respective values are matched, the marcher 25 outputs a "H" level signal. This signal is supplied to an AND gate 41. In this condition, when the AND gate 41 receives a counter clock, it supplies a clock signal to a counter 26. The count value that the counter counts with the clock signal is supplied to an elastic buffer 21 as a write address thereof. On the other hand, when the marcher 25 outputs the "H" level signal and a NAND gate 42 receives a write clock, the NAND gate 42 outputs a "L" level signal. This signal is supplied to the elastic buffer 21 as a write enable signal (hereinafter symbolized with Thus, the input cell is written to the elastic buffer FIG. 10 is a schematic diagram showing a time chart of a cell write operation of the circuit of the embodiment of FIG. 9. In FIG. 10, when a cell which is determined as a match cell by the marcher 25 is input, a matcher output signal goes "H". When the counter clock is input, a write address is supplied to the elastic buffer 21. When the write clock is input, the write enable signal $\overline{WE}$ goes "L".

Figure 11:
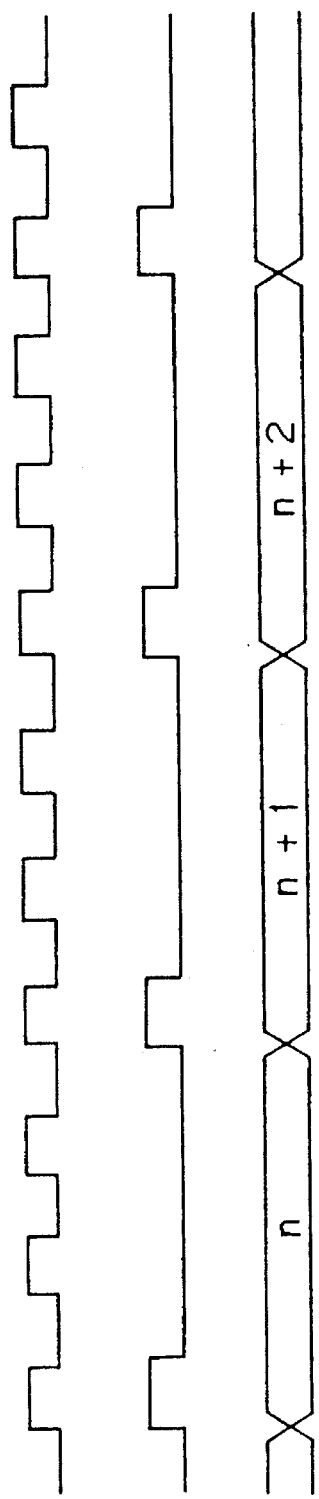
FIG. 11 is a schematic diagram describing a designating method of a read address of an elastic buffer.

FIG. 11 is a schematic diagram showing a method of designating the read address of the elastic buffer 21 of FIG. 6. In FIG. 11, in the case where the read speed is limited to ⅓ times as low as the speed of a clock signal, when the clock signal Ⓐ is input to the frequency divider 27 of FIG. 6, a signal Ⓑ is output. The count value that the counter 28 counts at the speed ⅓ times as low as the clock speed is supplied to the elastic buffer 21 as a read address Ⓒ thereof.

Figure 12A:
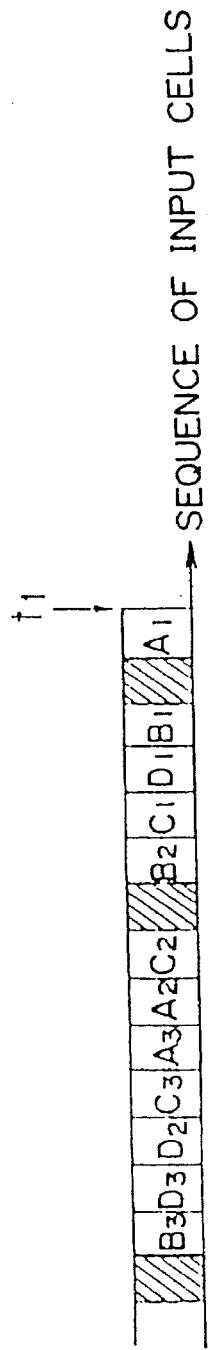
FIGS. 12A to 12C provide a schematic diagram showing a relation of an input sequence and an output sequence of ATM cells.

FIG. 12 is schematic diagrams showing relation of an input sequence and an output sequence of ATM cells of the police circuit of FIG. 6. FIG. 12A shows the input sequence of ATM cells starting at time $t_1$. In this figure, A1, B1, ... , and so forth represent input cells received from different subscribers. In these input cells, different sets of the VPI and VCI are added, respectively. In the figure, the hatched portions represent blank cells.

Figure 12B:
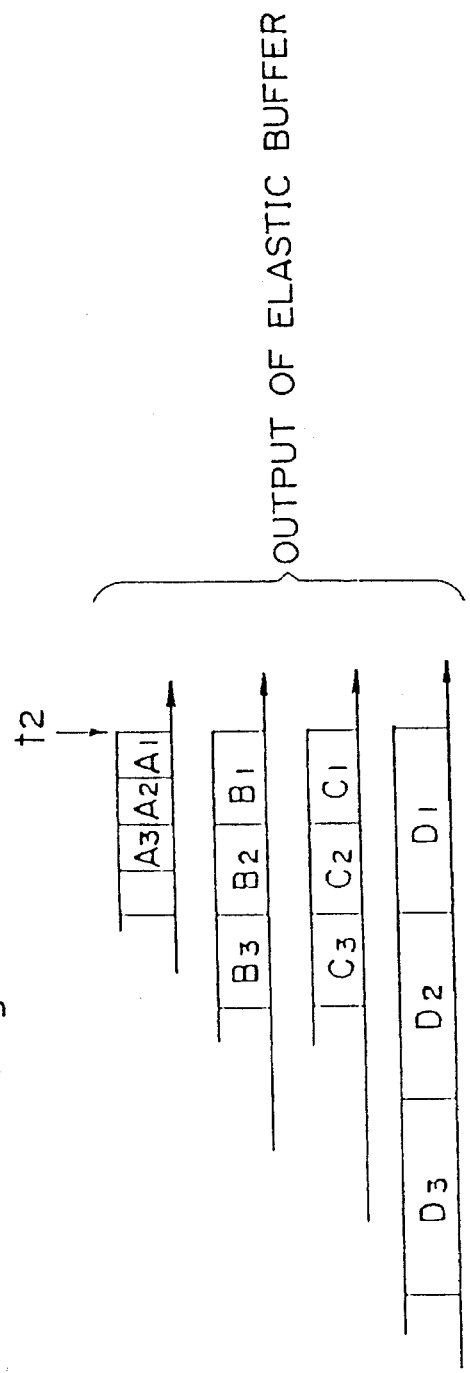

FIG. 12B shows an example of the output sequence of each elastic buffer. The time necessary from cell input start time $t_1$ to elastic buffer output start time $t_2$ depends on the depth of the elastic buffer, the difference between the write and read speeds, and so forth. As described above, elastic buffers disposed in accordance with subscribers only output ATM cells which are transmitted from the subscribers, respectively.

Figure 12C:
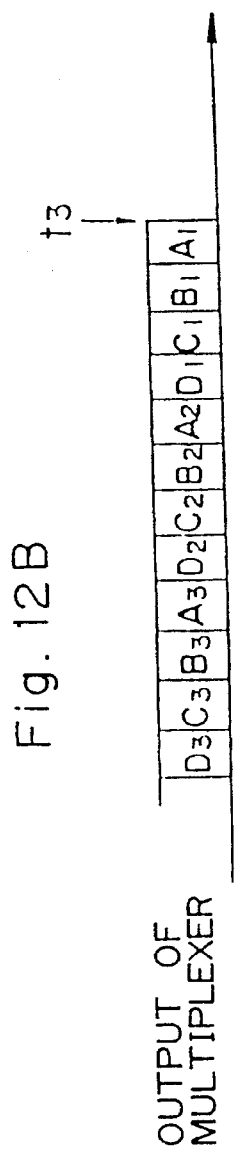

FIG. 12C shows an example of an output of the multiplexer 23 of FIG. 6. The time from elastic buffer output start time $t_2$ to multiplexer output start time $t_3$ depends on the depth of each first-in first-out memory (FIFO) and so forth. The dominant principle of the cell flow of the police circuit is that in the case where there are two cells which have the same VPI/VCI values one cell which is input later should not get ahead of the other cell which is input earlier.

The width of cells of each elastic buffer of FIG. 12B represents time intervals of cells which are input to the FIFO 22 of FIG. 6. For example, while a cell $B_1$ is input to the FIFO for B, cells $A_1$ and $A_2$ are input to the FIFO for A. With respect to the output of the multiplexer of FIG. 6C, since the multiplexing theory of multiplexer is out of the scope of the present invention, FIG. 6C only shows an example of the output of the multiplexer. In this example, when a particular FIFO receives a token, if it cannot store a cell, the token is sent to the next FIFO. In FIG. 12B, each FIFO stores three cells. Thus, when the token is circulated in the order of A, B, C, D, A, ..., for example the cell $D_2$ is not output later than the cell $A_3$.

In addition, the dominant principle of the cell flow of "a cell which is input later should not get ahead of a cell which is input earlier" is applied to each of An, Bn, Cn, and Dn stored in each FIFO in FIG. 12B. As long as the FIFO memories are used, regardless of what type of output control is used, this dominant principle is not violated.

Figure 13B:
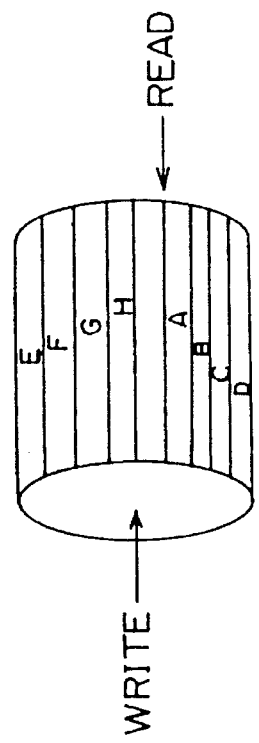
Figure 13A:
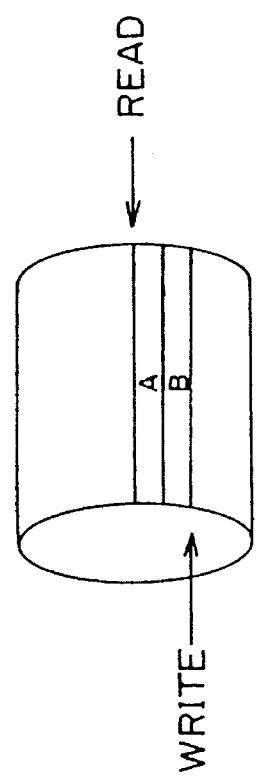

FIG. 13 is schematic diagrams describing the band limitation of input cells of the present invention. FIG. 13A shows an initial state where a write address of an elastic buffer follows a write address thereof. On the other hand, FIG. 13B shows a state where a write address of an elastic buffer catches up with a read address thereof. In this situation, by stopping the write operation of the elastic buffer, the band is forcedly limited.

For example, assume that a band designated to a subscriber is N (Mbps) and an elastic buffer is read and write with each cell (which is 53 bytes).

By reading the elastic buffer at the following speed, the cell input speed to the ATM exchange can be limited to the band designated to the subscriber.

$$N \times 10^6 / 53 \times 8 = N \times 10^6 / 424$$

Actually, by using one of a set of predetermined speeds (for example, $\frac{1}{2}^N$) which is close to the above-mentioned speed, the band is limited.

Figure 14:
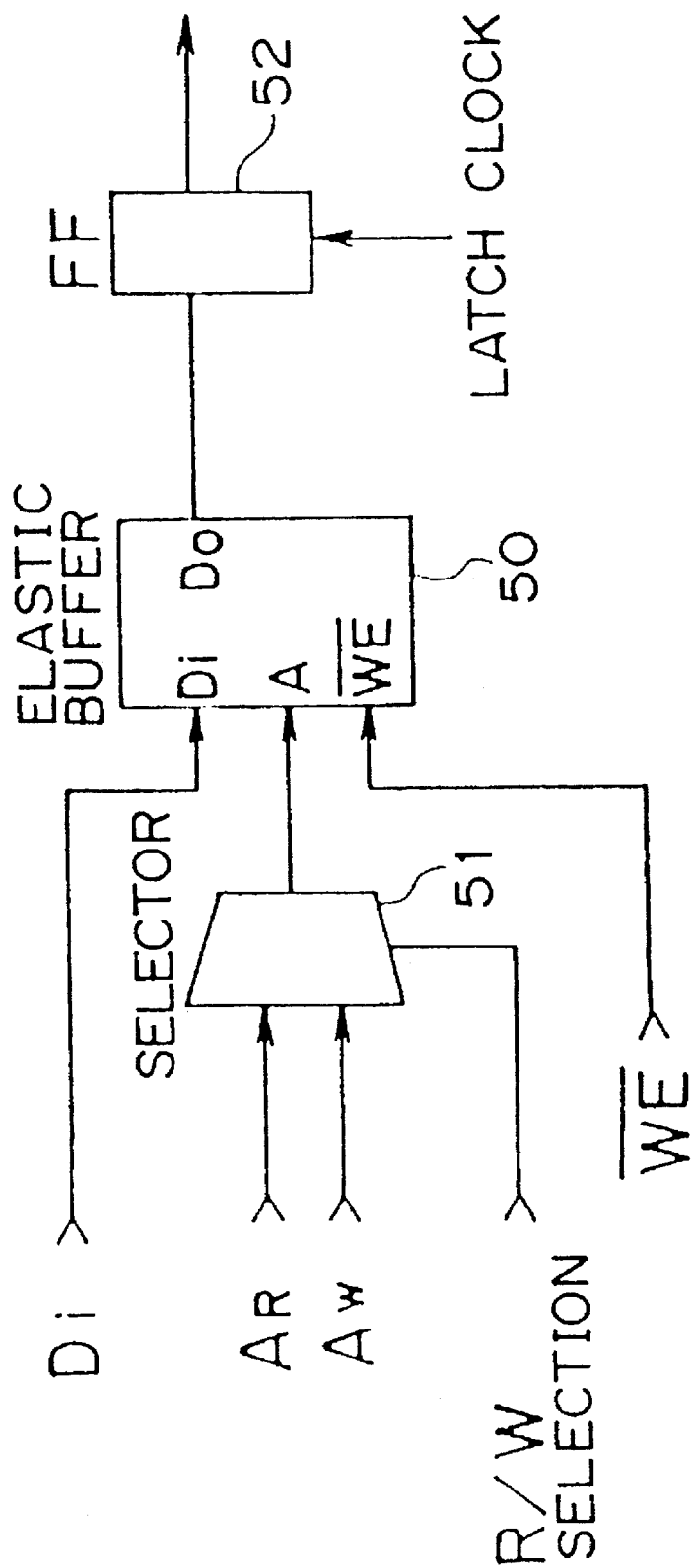
FIG. 14 is a block diagram showing the construction of an elastic buffer of another embodiment of the present invention.

FIG. 14 is a block diagram showing the construction of an elastic buffer of another embodiment of the present invention. In this example, as an elastic buffer, by using a conventional single port memory and separating a write cycle from a read cycle, a police circuit is constructed. In the figure, a read cycle and a write cycle of an elastic buffer 50 are switched with a read/write selection signal. When a selector 51 supplies a read address or a write address to the elastic buffer 50 and the write enable $\overline{WE}$ signal goes "L", the elastic buffer 50 starts writing cells. The elastic buffer 50 supplies the output to a flip-flop (latch) 52. When the latch clock goes "H", the flip-flop 52 latches the output of the elastic buffer 50.

Figure 15:
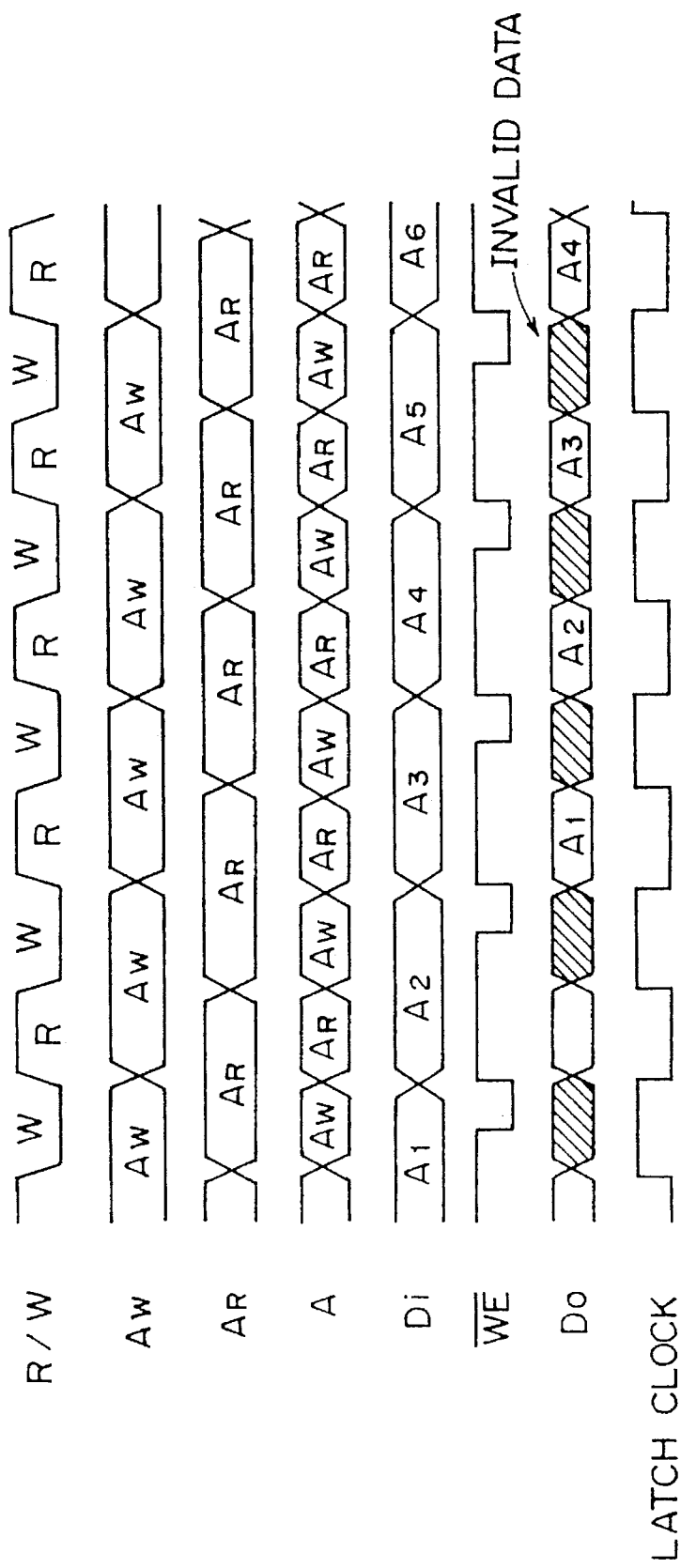
FIG. 15 is a schematic diagram showing a timing diagram of a data write operation and a data read operation of the circuit of FIG. 14.

FIG. 15 is a schematic diagram showing a time chart of the data write/read operations of the embodiment of FIG. 14. FIG. 15 shows the case where the data write speed is the same as the data read speed. When these speeds differ, a read address signal $A_R$, a write address signal $A_W$, the write enable signal $\overline{WE}$, and so forth are controlled in accordance with the difference of these speeds.

In addition, FIG. 15 shows the case where cells which are sequentially input are read without delay as the relation of input data Di and output data Do. However, cells are not always input sequentially. In addition, disable data of the data output Do of the figure represents an unstable output in a write cycle of a conventional memory such as a random access memory.

Figure 16:
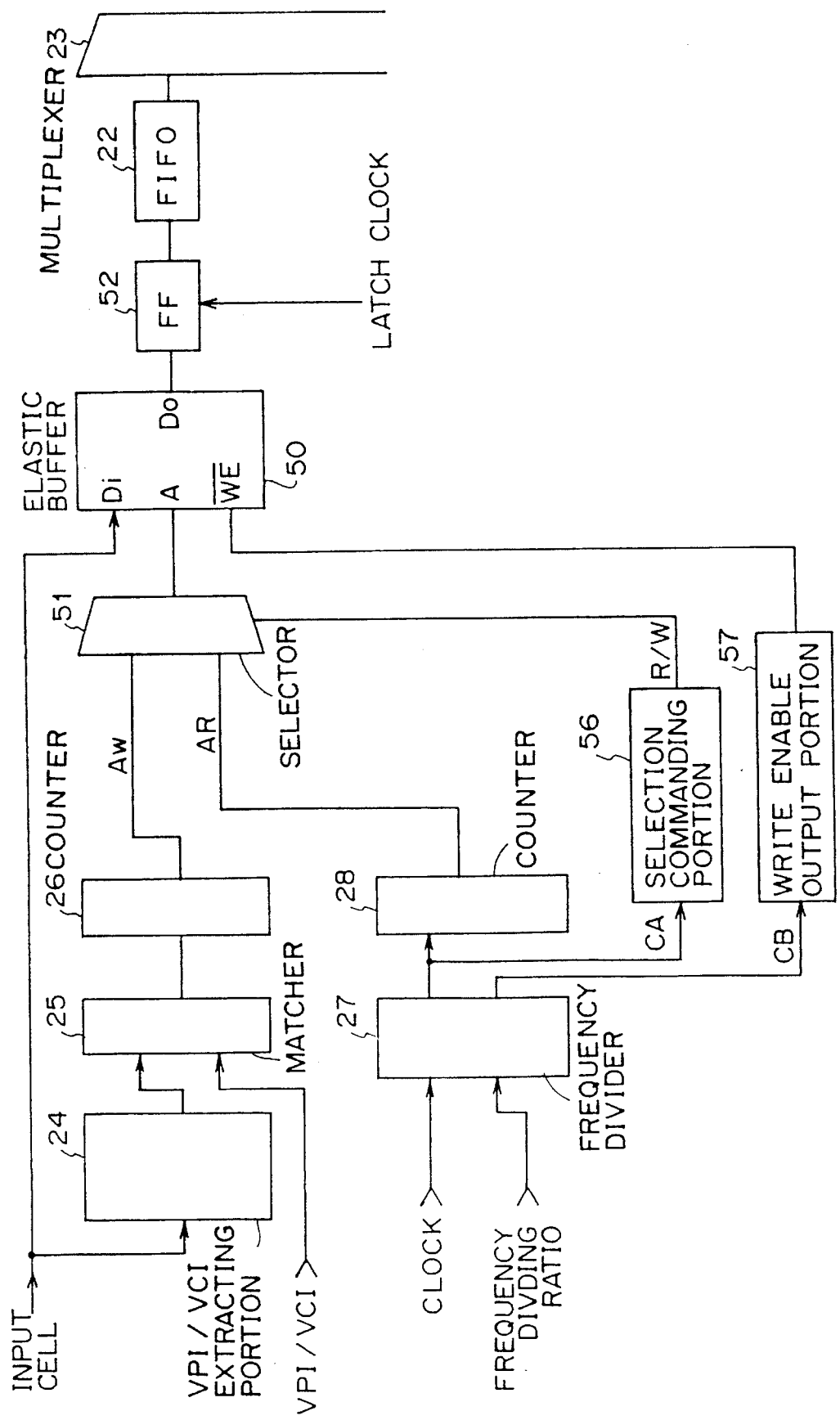
FIG. 16 is a block diagram showing the construction of a police circuit using the elastic buffer of FIG. 14.

FIG. 16 is a circuit diagram showing the construction of a combination circuit of the police circuit of FIG. 6 and the elastic buffer of another embodiment of FIG. 14. In FIG. 16, the same portions as FIGS. 6 and 14 are represented by the same reference numbers. In FIG. 16, a selection commanding portion 56 which outputs a read/write selection signal to the selector 51 and a write enable output portion 57 which outputs a write enable signal to the elastic buffer 50 are additionally disposed. With reference to the timing diagram of FIG. 17, the operations of these portions will be described.

Figure 17:
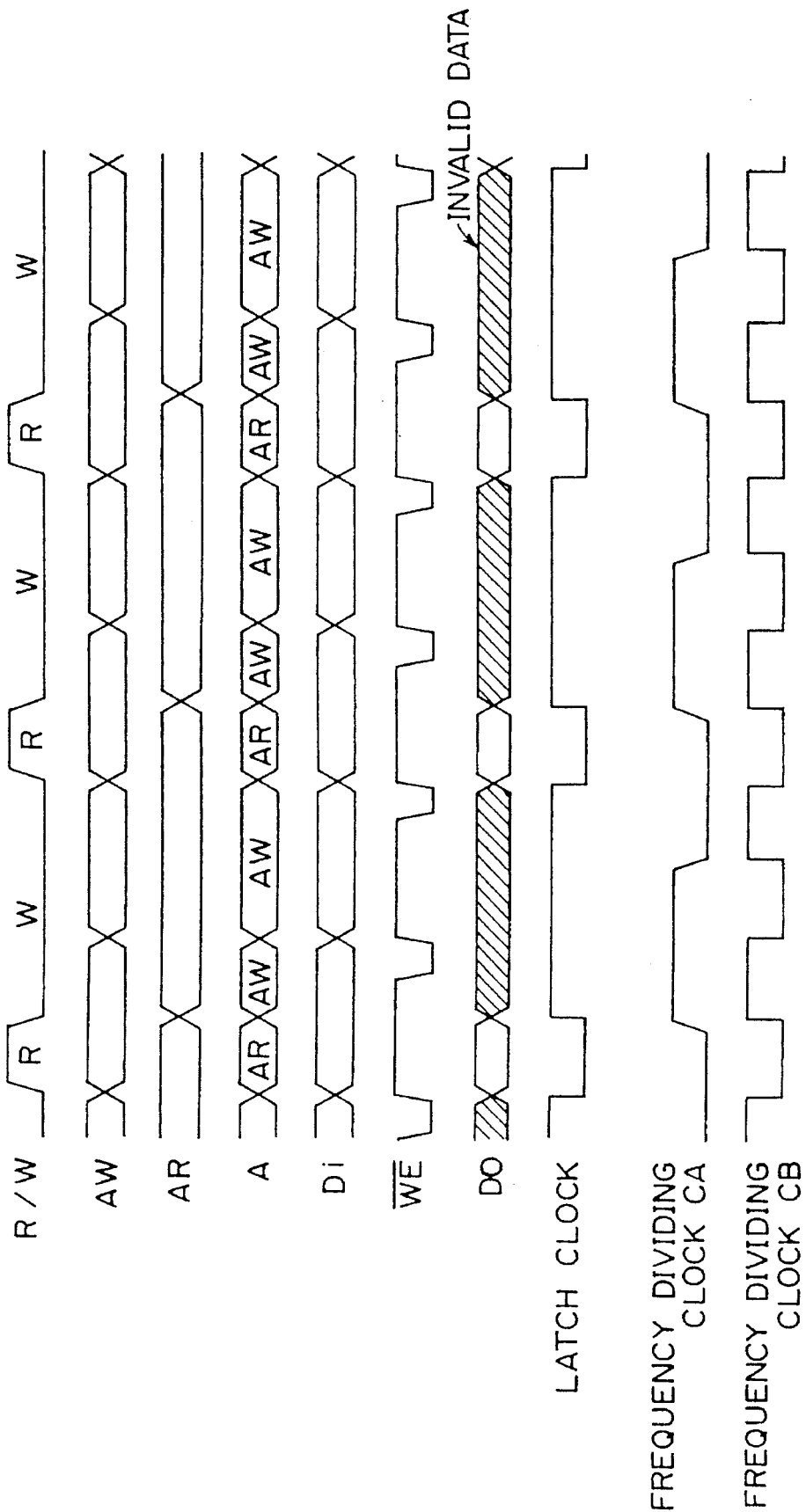
FIG. 17 is a schematic diagram showing a timing diagram of data input/output operation of the police circuit of FIG. 17.

FIG. 17 is a schematic diagram showing a timing diagram in the case where the data write speed of the elastic buffer 50 of FIG. 16 differs from the data read speed thereof. In this case, so as to keep the write speed constant, the read speed is halved.

In FIG. 17, the frequency of the output $C_A$ which is supplied from the frequency divider 27 to the selection commanding portion 56 shown in FIG. 16 is half the frequency of the output $C_B$ which is supplied to the write enable output portion 57. Thus, the read speed of the elastic buffer 50 can be half the write speed thereof.

Although the selection commanding portion 56 and the write enable output portion 57 can be simply constructed of shift registers and gates, the circuit construction for allowing the frequency ratio of $C_A$ and $C_B$ to be freely set is very complicated. In this example, these blocks are shown in accordance with the level of the construction of other blocks.

As described above, in the present invention, a read address of an elastic buffer generally follows a write address thereof. When there is no read data, read-operation is not performed. When the write address gets ahead of the read address, the address is adjusted such as by stopping the read operation. In this situation, cells which have been written are partially discarded. However, when the subscriber side transmits cells in accordance with a predetermined band, they are not discarded. The values of VPI and VCI compared by a marcher and a frequency dividing ratio of a frequency divider necessary for generating a read clock can be freely set.

Although the present invention has been shown and described with respect to a best mode embodiment thereof, it should be understood by those skilled in the art that the foregoing and various other changes, omissions, and additions in the form and detail thereof may be made therein without departing form the spirit and scope of the present invention.

What is claimed is:

1. A police system of ATM exchange for use in an ATM communication system with asynchronous transmission mode (ATM) cells, comprising:

an ATM exchange for exchanging said ATM cells; and input cell speed limiting means disposed in an input side of said ATM exchange and having a plurality of elastic buffers with a read speed equivalent to a band designated to each of a plurality of subscribers accommodated in said exchange, said elastic buffers being in accordance with said subscribers, said input cell speed limiting means being arranged to limit the speeds of cells which are transmitted from each of said subscribers to said exchange to the band designated to each of said subscriber.

2. The police system of ATM exchange as set forth in claim 1, further comprising:

a plurality of line interfaces each having a managing circuit for managing a band of input cells and being disposed on an input side of an ATM switch in said ATM communication system and adapted for connecting a plurality of terminals through a network terminator, said input cell speed limiting means being constructed of said managing circuit; and a central control means for outputting a set of a virtual path identifier (VPI) and a virtual channel identifier (VCI) designated to each of said subscribers to each of said managing circuits.

3. The police system of ATM exchange as set forth in claim 2, wherein each said managing circuit comprises:

VPI/VCI extracting means for extracting a virtual path identifier (VPI) and a virtual channel identifier (VCI) from a header portion of an input cell;

matching means disposed in accordance with each of said subscribers and adapted for matching values of VPI and VCI received from said VPI/VCI extracting means with values of VPI and VCI received from said central control means;

first counter means for counting an output of said matching means;

elastic buffer means for receiving an output of said first counter means as a write address of said elastic buffer means and for storing an input cell to said write address of said elastic buffer means;

frequency divider means for dividing the frequency of a clock signal;

second counter means for counting an output of said frequency divider means and for outputting a read address of said elastic buffer means;

first-in first-out memory means disposed in accordance with each of said subscribers and adapted for storing an output of said elastic buffer means; and multiplexer means for multiplexing an output of said first-in first-out memory means.

4. The police system of ATM exchange as set forth in claim 3, wherein said VPI/VCI extracting means comprises:

first flip-flop means for latching a value of VPI stored in the first and second bytes of the header portion of said input cell;

second flip-flop means for latching a value of VCI stored in the second to fourth bytes of the header portion of said input cell; and shift register means for receiving a frame pulse representing the start position of an input cell and a clock signal and for outputting a VPI latch command signal to said first flip-flop means and a VCI latch command signal to said second flip-flop means.

5. The police system of ATM exchange as set forth in claim 3, wherein said matching means comprises:

first comparator means for receiving a value of VPI extracted by said VPI/VCI extracting means;

second comparator means for receiving a value of VCI extracted by said VPI/VCI extracting means;

first register means for storing a value of VPI received from said central control means and for sending the value of VPI to said first comparator means;

second register means for storing a value of VCI received from said central control means and for sending the value of VCI to said second comparator means; and AND circuit means for outputting a match detection signal when said first comparator means determines that the two values of VPI are matched and said second comparator means determines that the two values of VCI are matched.

6. The police system of ATM exchange as set forth in claim 3, further comprising:

AND circuit means disposed between said matching means disposed in accordance with each of said subscriber and said first counter means and adapted for receiving an output of said matching means and a counter clock signal and for sending the resultant signal to a clock signal input terminal of said first counter means; and AND circuit means for receiving an output of said matching means and a write clock signal and for sending a write enable signal to said elastic buffer means.

7. The police system of ATM exchange as set forth in claim 2, wherein each of said police managing circuits disposed in accordance with each of said subscribers comprises:

elastic buffer means constructed of a single port type memory;

selector means for selecting a write address or a read address and for sending said selected one to said elastic buffer means; and first flip-flop means for latching an output of said elastic buffer means.

8. The police system of ATM exchange as set forth in claim 7, wherein each of said managing police circuit further comprises:

VPI/VCI extracting means for extracting a virtual path identifier (VPI) and a virtual channel identifier (VCI) from a header portion of an input cell;

matching means disposed in accordance with each of said subscribers and adapted for matching values of VPI and VCI received from said VPI/VCI extracting means with values of VPI and VCI received from said central control means;

first counter means for counting an output of said matching means and for sending an write address of said elastic buffer means to said selector means;

frequency divider means for dividing the frequency of a clock signal;

second counter means for counting an output of said frequency divider means and for sending a read address of said elastic buffer means;

selection commanding means for receiving an output of said frequency dividing means through said second counter means and for sending a write/read selection signal to said selector means;

write enable output means for sending a write enable signal to said elastic buffer means using a second output of a frequency higher than an output from said frequency divider means to said second counter means; and multiplexer means for multiplexing an output of said first-in first-out memory means.

9. The police system of ATM exchange as set forth in claim 8, wherein said VPI/VCI extracting means comprises:

first flip-flop means for latching a value of VPI stored in the first and second bytes of the header portion of said input cell;

second flip-flop means for latching a value of VCI stored in the second to fourth bytes of the header portion of said input cell; and shift register means for receiving a frame pulse representing said start position of said input cell and a clock signal and for sending a VPI latch command signal to said second flip-flop means and a VCI latch command signal to said third flip-flop means.

10. The police system of ATM exchange as set forth in claim 8, wherein said matching means comprises:

first comparator means for receiving a value of VPI extracted by said VPI/VCI extracting means;

second comparator means for receiving a value of VCI extracted by said VPI/VCI extracting means;

first register means for storing a value of VPI received from said central control means and for sending the value of VPI to said first comparator means;

second register means for storing a value of VCI received from said central control means and for sending the value of VCI to said second comparator means; and AND circuit means for outputting a match detection signal when said first comparator means determines that the two values of VPI are matched and said second comparator means determines that the two values of VCI are matched.

11. The police system of ATM exchange as set forth in claim 1, wherein a read speed of each of said elastic buffers in accordance with each of said subscribers is set to one of a plurality of predetermined speed values $½^n$, where n is an integer, the set value being close to $N \times 10^6 / 424$ where N is a band designated to each of said subscribers (in Mbps).

12. The police system of ATM exchange as set forth in claim 1, wherein a cell write operation is stopped when cell data is written to all storage areas of one of said elastic buffers and a write address of said elastic buffer catches up with a read address thereof so as to limit an input cell speed of said ATM exchange.

* * * * *